March 9, 1937.   R. J. STIMSON   2,073,032
SPRING SUSPENSION FOR VEHICLES
Filed Nov. 19, 1934    3 Sheets-Sheet 1
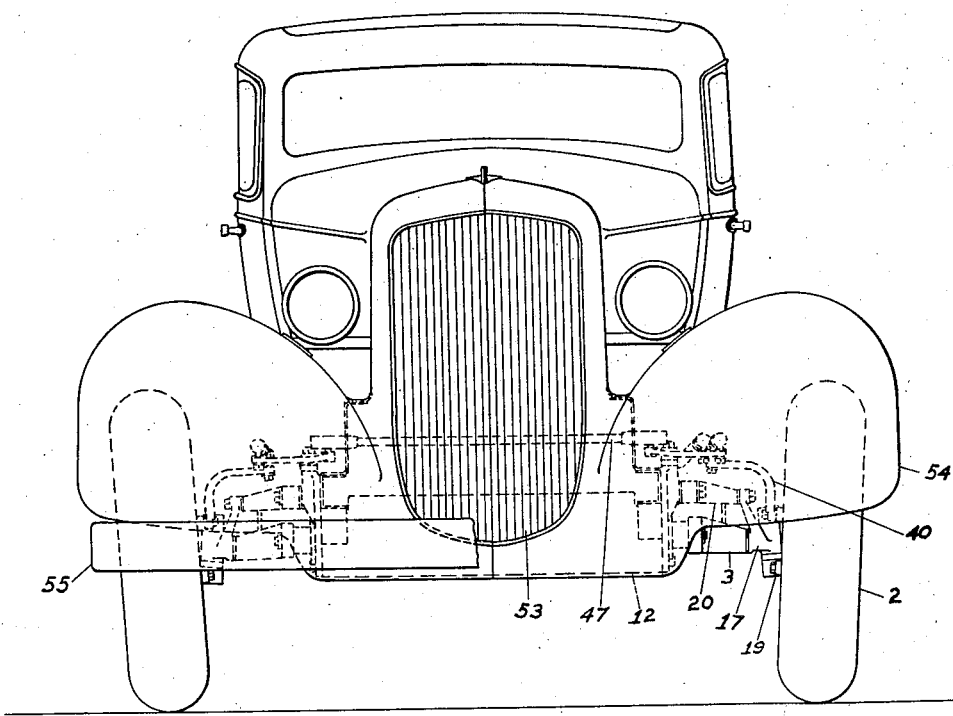
Fig. I
Fig. II
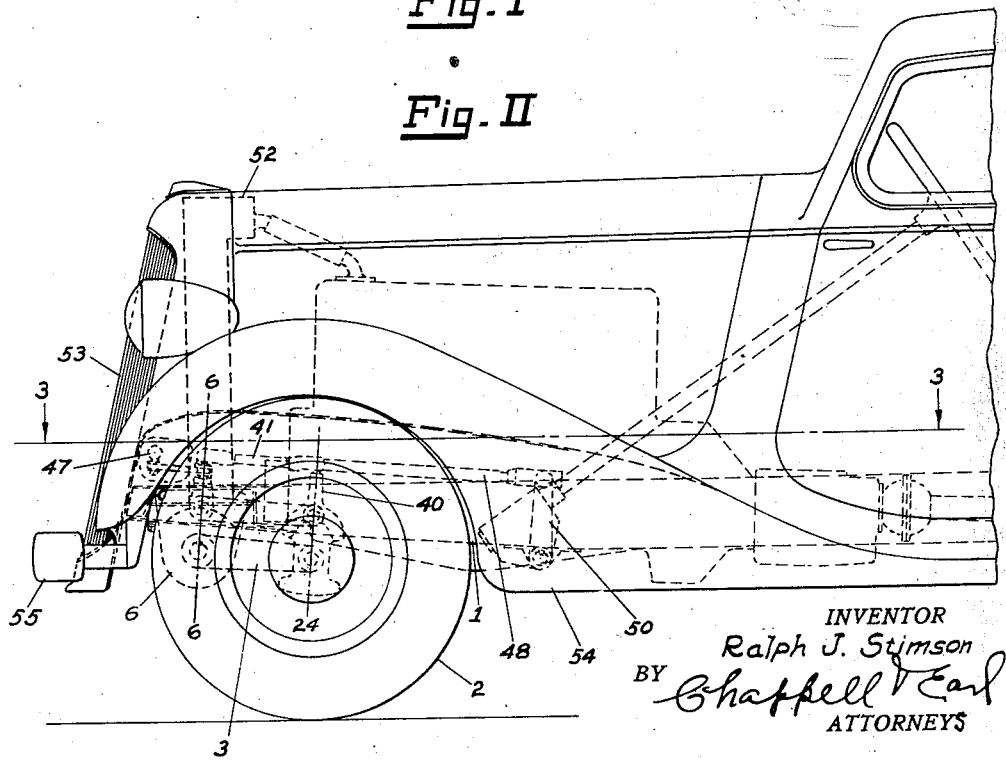
INVENTOR
Ralph J. Stimson
BY Chappell & Earl
ATTORNEYS

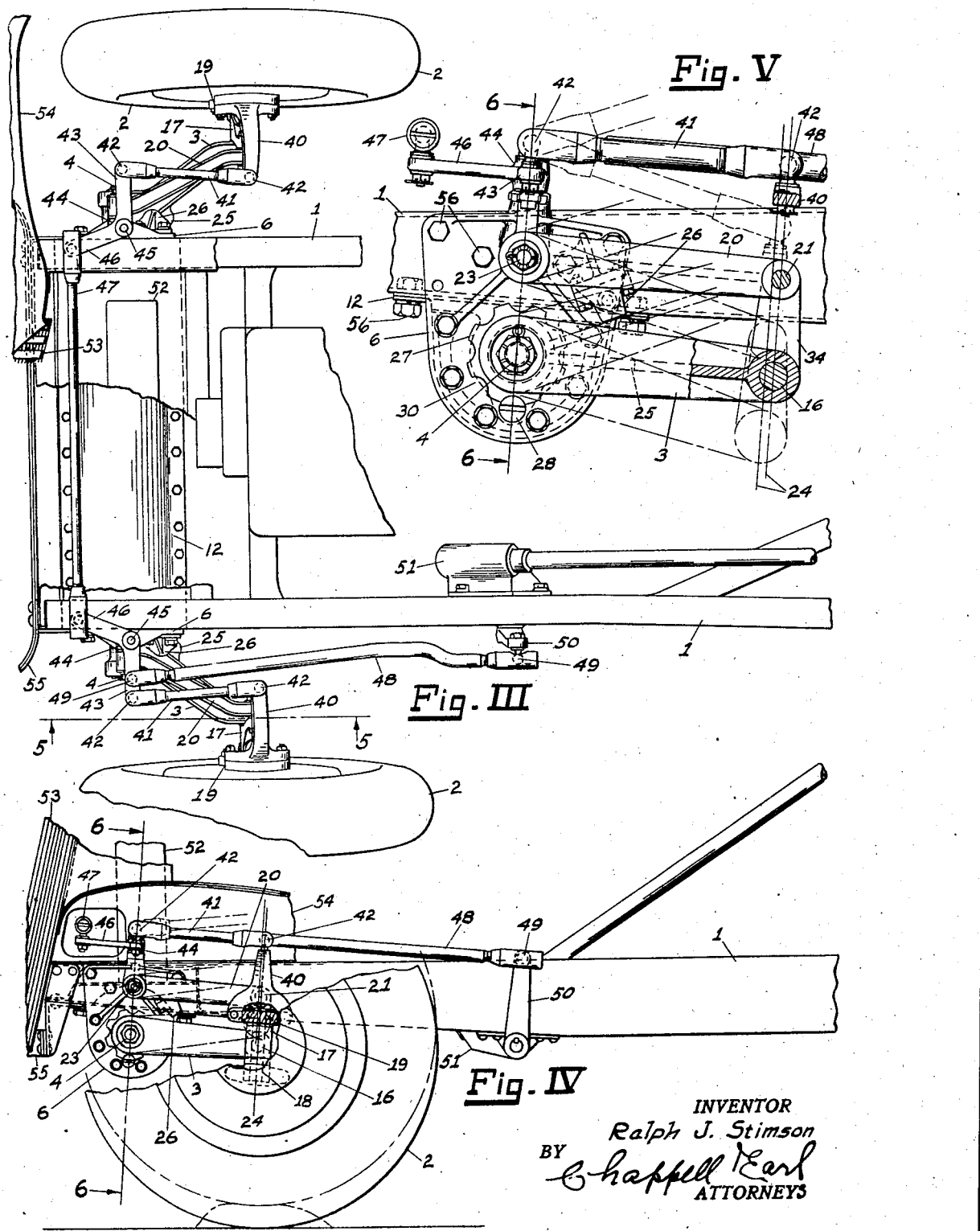

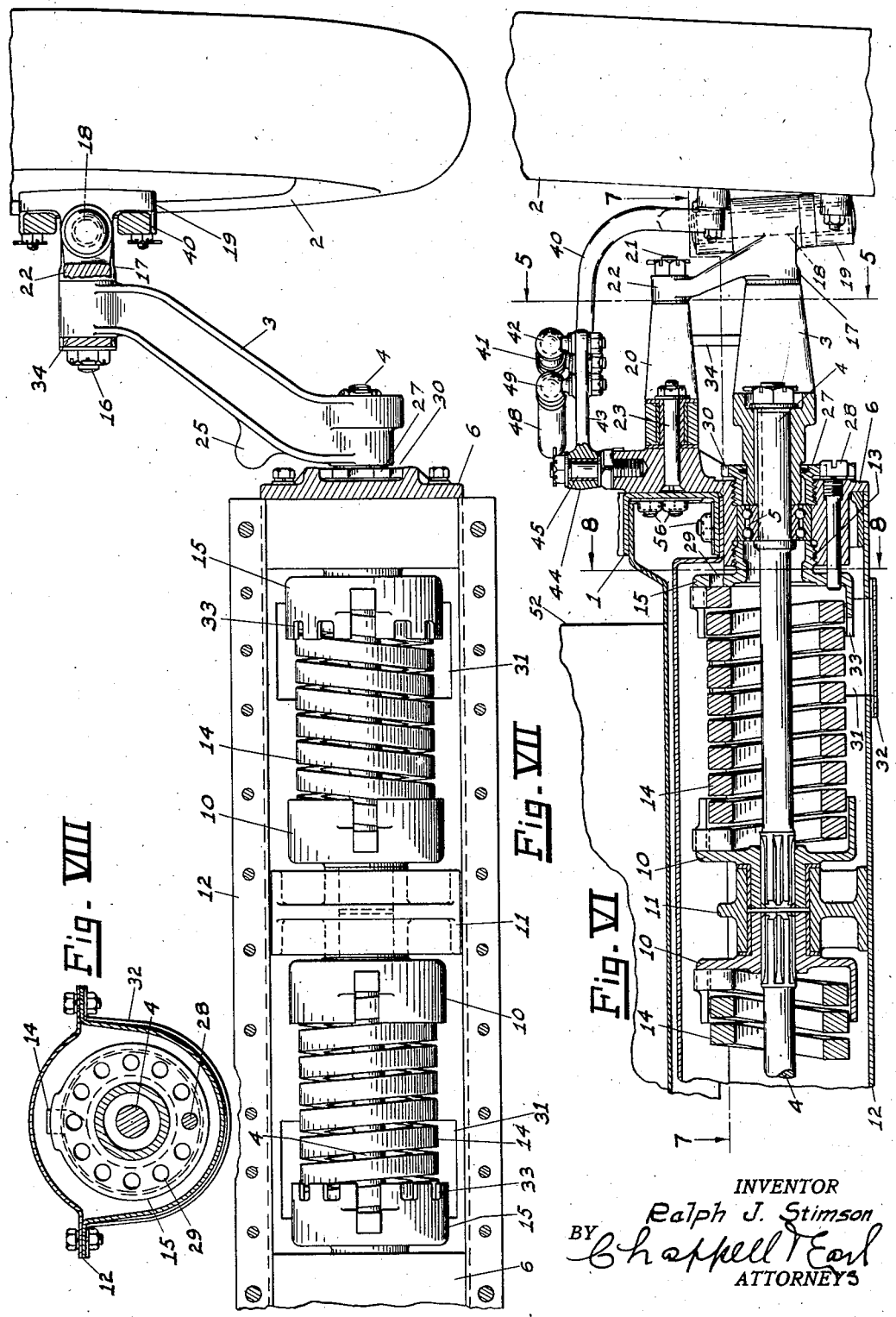

Patented Mar. 9, 1937

2,073,032

UNITED STATES PATENT OFFICE 2,073,032

SPRING SUSPENSION FOR VEHICLES

Ralph J. Stimson, Flint, Mich.

Application November 19, 1934, Serial No. 753,682

18 Claims. (Cl. 280—124)

The main objects of this invention are:

First, to provide an improved spring suspension for vehicles and the like which is adapted to permit individual action or springing of the wheels relative to the frame thereof.

Second, to provide a spring suspension unit of the foregoing character which is especially well adapted for use with the front wheel assembly of conventional automotive vehicles.

Third, to provide a so-called knee action spring suspension for motor vehicles which is effectively concealed.

Fourth, to provide a spring suspension of this character which does not detract from the appearance of the vehicle.

Fifth, to provide a spring suspension which is simple and economical in its parts and very efficient and effective in operation.

Objects relating to details and economies of my invention will appear from the description to follow. The invention is defined and pointed out in the claims.

A structure which is a preferred embodiment of my invention is illustrated in the accompanying drawings, in which:

Fig. I is a view in front elevation of an automobile embodying the features of my invention.

Fig. II is a fragmentary view in side elevation of the automobile.

Fig. III is an enlarged fragmentary view partially in plan and partially in horizontal section on a line corresponding to line 3—3 of Fig. II.

Fig. IV is a fragmentary view in side elevation, parts being broken away and shown in vertical section.

Fig. V is an enlarged fragmentary view partially in side elevation and partially in section on a line corresponding to line 5—5 of Figs. III and VI, the movement of the parts being indicated by broken lines.

Fig. VI is an enlarged sectional view taken on a line corresponding to line 6—6 of Figs. II, IV, and V.

Fig. VII is an enlarged fragmentary view partially in plan and partially in section on a line corresponding to line 7—7 of Fig. VI.

Fig. VIII is a transverse section taken on line 8—8 of Fig. VI.

Referring to the drawings, the main frame I of the vehicle is provided with a pair of front wheels 2 operatively associated with crank arms 3 which are secured at their inner ends to the shafts 4. These shafts are rotatably mounted at their outer ends on the bearings 5 in the brackets 6. The inner end of each shaft has a splined driving connection with one of the spring actuating members 10, the latter being independently rotatable in the bearing 11 which is fixed within the transverse substantially cylindrical housing 12.

The housing is arranged under the forward end of the frame 1 between the brackets 6 and serves to enclose and support the springs 14 and their actuating parts, the housing also being adapted to contain a lubricant for the mechanism. Each of the spring actuating members 10 is yieldingly connected with one of the brackets 6 by one of the torsion springs 14, one end of the spring being adapted to turn with the actuating member 10 and the other end being secured to a stationary spring seat 15 which has a projection 13 threaded into the bracket 6. The arrangement is such that the load supported by the wheels 2 tends to rock the arms 3 upwardly and turn the shafts 4 and the spring actuating members 10 to twist the springs 14 which yieldingly resist such movement and serve to absorb shock.

In the illustrated embodiment, the outer end of each arm 3 is pivoted to a stud 16 on a support member 17, the latter being joined by a pivot pin 18 to the spindle member 19 on which the wheel 2 rotates. The pivot pin 18 and its associated members constitute a knuckle joint permitting the turning of the wheel relative to the support member 17 for steering purposes.

A link 20 is pivoted at one end to a stud 21 on the upwardly projecting arm 22 of the member 17 and at its other end to a stud 23 on the bracket 6, the link serving to prevent rotation of the member 17 with the wheel 2 and acting to aid the arm 3 in resisting side thrusts. The tie bar 34 coacts with the support member 17 to hold the stud 16 and stud 21 parallel. The center lines of the shaft 4 and studs 23, 16, and 21 are arranged in the form of a parallelogram so that when the arm 3 and link 20 oscillate in response to the movement of the wheel 2 relative to the frame 1, the center line 24 of the pivot pin 18 remains parallel to the line 6—6 for all positions of the wheel 2, as indicated by the broken lines of Fig. V. The stop 26 is preferably covered with a cushioning material such as rubber.

The tension of the springs 14 is readily adjusted by turning the stationary spring seats 15 in the brackets 6. Inasmuch as the tension of the springs controls the height of the frame 1 relative to the wheels 2, the adjustable spring seats 15 also provide means for adjusting the position of the frame relative to the wheels and to the ground. For adjusting and locking the spring seats, I provide a clamping screw 27 in each of the brackets 6, adapted to cooperate with the threaded portion 13 of the seat 15 to hold the bearing 5 in place. The spring seat 15 and clamping screw 27 are locked in adjusted position by means of the lock pin 28 which is threaded into the bracket 6 and projects into one of a series of holes 29 in the spring seat, the head of the pin engaging one of a series of notches 30 in the head of the screw 27.

With the lock pin removed, the screw 27 loosened, and the outer ends of the arms 3 supported by the wheels 2 and the desired load on the frame 1, the spring seats 15 are adjusted to give the correct tension to the springs 14. The clamping screw 27 is then tightened and the parts again locked in position by the pin 28. To permit adjustment of the springs after the assembly of the housing 12 with the frame 1, I provide openings 31 in the lower part of the housing and near the ends thereof, these openings being covered by removable plates 32 and providing access to the inside of the housing for the turning of the spring seats 15. For facilitating the turning of the spring seats 15 with a wrench or other suitable tool, the seats are provided with notches 33 in the inner edge thereof.

Each of the wheel spindle members 19 is provided with an upwardly projecting and inwardly extending steering arm 40 which is connected by a link 41 and universal joints 42 to one arm 43 of a bell crank lever 44 which is pivoted on a stud 45 on each of the brackets 6. The forwardly projecting arms 46 of the bell crank levers are connected by the tie rod 47 which is pivoted at its ends to the arms. The tie rod is disposed above the frame 1 and between the radiator 52 and the front screen 53. This increases the ground clearance to a considerable extent over other types of automotive vehicles wherein the tie rod is disposed below the frame.

The arm 43 of one of the bell crank levers is connected by a drive link 48 and universal joints 49 to the arm 50 of the steering gear 51 which may be of any approved design and located on either side of the chassis. Actuation of one of the bell crank levers 44 by the driving link 48 imparts a corresponding movement to the other lever and turns the two wheels to steer the vehicle. The universal connections of the link 41 permit the steering arm 40 to move up and down with the wheel 2, the link 41 being parallel with the arm 3 and the link 20 so that the steering gear is practically unaffected by the rising and falling of the wheels.

As shown by Figs. I and II, my arrangement is such that the spring suspension unit and steering mechanism are concealed by the fenders 54, the screen 53 and the bumper 55 of the automobile. In this way, my spring suspension unit and steering mechanism are protected from injury in the operation of the vehicle. The appearance of the car is also improved, and the elimination of parts projecting outside the outline of the main structure improves the streamlining effect, a very desirable feature especially at high speed. Further, the spring suspension is disposed in a central balanced relation relative to the frame instead of being positioned adjacent the wheels. A further advantage is the unusual degree of clearance.

My complete unit comprising the housing 12 with the parts within, the wheel mountings and the steering connections may be manufactured and assembled separately from the rest of the chassis and quickly assembled with the frame 1 and secured thereto as by the bolts 56. By eliminating the steering connections and the knuckle joints on the steering members 17, my spring suspension unit may be readily adapted to the rear or non-steering wheels of a vehicle. In such case, the support member is rigidly connected to the wheel spindle or axle member 19.

In the illustrated embodiment of my invention, the wheels 2 are free to rise and fall to adapt themselves to uneven surfaces independently of each other, each spring being twisted an amount depending upon the height of the obstruction encountered by the wheel and the force of the impact. Inasmuch as strains due to steering, propelling of the wheels and side thrusts on the wheels are borne by the bearing brackets 6, the springs 14 are relieved of such stresses. Consequently, the springs may be made more resilient, thereby improving the cushioning qualities and reducing the tendency toward distortion of the main frame and body due to variations in the relative heights of the wheels.

I have illustrated and described my improvements in an embodiment which I have found very practical. I have not attempted to illustrate or describe other embodiments or adaptations as it is believed this disclosure will enable those skilled in the art to embody or adapt my improvements as may be desired.

Although I have shown and described a certain specific embodiment of my invention, I am fully aware that many modifications thereof are possible. My invention is therefore not to be restricted except insofar as is necessitated by the prior art and by the spirit of the appended claims.

Having thus described my invention, what I claim as new and desire to secure by Letters Patent, is:

1. The combination with a vehicle having a frame provided with inwardly opening side members of channel section, and a pair of wheels disposed at opposite sides of the frame, of a pair of brackets secured to said side members and being arranged in transverse alinement relative to the frame, each bracket having a side portion overlapping the outer side of the side member and a bottom portion depending below the lower side of the side member, bolts connecting the side portion of each bracket to the web of the side member and the lower portion of the bracket to the lower flange of the side member respectively, a transverse cylindrical housing disposed under the frame between the lower portions of said brackets and containing a central bearing, end bearings in the lower portions of said brackets and in axial alinement with said central bearing, opposed spring actuating members independently rotatable in said central bearing, a stationary inwardly facing spring seat threaded into the lower portion of each bracket for rotary adjustment, a coiled torsion spring disposed between each seat and spring actuating member, a shaft journaled through each end bearing and having its inner end splined to a spring actuating member, a crank arm keyed to the outer end of each shaft and extending outwardly and rearwardly in a plane substantially parallel with that of the frame, a support member pivoted to the outer end of each arm and having an upwardly projecting arm, a link pivoted to the side portion of each bracket above the shaft and to the upwardly projecting arm of each support member, a tie bar connecting said crank arm and link, means including a bearing member and knuckle joint connecting each wheel to a support member for turning movement, means including bell crank levers pivoted to the tops of said brackets and a tie rod disposed above said frame for turning said wheels in unison to steer the vehicle, means including a clamping member threaded in the lower portion of each bracket for coaction with the spring seat to hold each end bearing in place, and a pin disposed through the lower portion of each bracket for keeping the spring seat and clamping member in adjusted position.

2. The combination with a vehicle having a frame provided with side members, and a pair of wheels disposed at opposite sides of the frame, of a pair of brackets secured to said side members and being arranged in transverse alinement relative to the frame, each bracket having a side portion overlapping the outer side of the side member and a bottom portion depending below the lower side of the side member, bolts connecting each bracket to the side member, a transverse housing disposed under the frame between the lower portions of said brackets and containing a central bearing, end bearings in the lower portions of said brackets and in axial alinement with said central bearing, opposed spring actuating members independently rotatable in said central bearing, a stationary inwardly facing spring seat threaded into the lower portion of each bracket for rotary adjustment, a coiled torsion spring disposed between each seat and spring actuating member, a shaft journaled through each end bearing and having its inner end splined to a spring actuating member, a crank arm at the outer end of each shaft and extending in a plane substantially parallel with that of the frame, a support member pivoted to the outer end of each arm and having an upwardly projecting arm, a link pivoted to the side portion of each bracket above the shaft and to the upwardly projecting arm of each support member, means including a bearing member and knuckle joint connecting each wheel to a support member for turning movement, means including bell crank levers pivoted to the tops of said brackets and a tie rod disposed above said frame for turning said wheels in unison to steer the vehicle, and a pin disposed through the lower portion of each bracket for keeping the spring seat in adjusted position.

3. The combination with a vehicle having a frame provided with inwardly opening side members of channel section, and a pair of wheels disposed at opposite sides of the frame, of a pair of brackets secured to said side members and being arranged in transverse alinement relative to the frame, each bracket having a side portion overlapping the outer side of the side member and a bottom portion depending below the lower side of the side member, bolts connecting the side portion of each bracket to the web of the side member and the lower portion of the bracket to the lower flange of the side member respectively, a transverse cylindrical housing disposed under the frame between the lower portions of said brackets and containing a central bearing, end bearings in the lower portions of said brackets and in axial alinement with said central bearing, opposed spring actuating members independently rotatable in said central bearing, a stationary inwardly facing spring seat threaded into the lower portion of each bracket for rotary adjustment, a coiled torsion spring disposed between each seat and spring actuating member, a shaft journaled through each end bearing and having its inner end splined to a spring actuating member, a crank arm keyed to the outer end of each shaft and extending outwardly and rearwardly in a plane substantially parallel with that of the frame, a support member pivoted to the outer end of each arm and having an upwardly projecting arm, a link pivoted to the side portion of each bracket above the shaft and to the upwardly projecting arm of each support member, a tie bar connecting each crank arm and link, a bearing member connecting each wheel to a support member, means including a clamping member threaded in the lower portion of each bracket for coaction with the spring seat to hold each end bearing in place, and a pin disposed through the lower portion of each bracket for keeping the spring seat and clamping member in adjusted position.

4. The combination with a vehicle having a frame provided with inwardly opening side members of channel section, and a pair of wheels disposed at opposite sides of the frame, of a pair of brackets secured to said side members and being arranged in transverse alinement relative to the frame, each bracket having a side portion overlapping the outer side of the side member and a bottom portion depending below the lower side of the side member, bolts connecting the side portion of each bracket to the web of the side member and the lower portion of the bracket to the lower flange of the side member respectively, a transverse cylindrical housing disposed under the frame between the lower portions of said brackets and containing a central bearing, end bearings in the lower portions of said brackets and in axial alinement with said central bearing opposed spring actuating members independently rotatable in said central bearing, a stationary inwardly facing spring seat threaded into the lower portion of each bracket for rotary adjustment, a coiled torsion spring disposed between each seat and spring actuating member, a shaft journaled through each end bearing and having its inner end splined to a spring actuating member, a crank arm keyed to the outer end of each shaft and extending outwardly and rearwardly in a plane substantially parallel with that of the frame, a support member pivoted to the outer end of each arm, a bearing member connecting each wheel to a support member, means including a clamping member threaded in the lower portion of each bracket for coaction with the spring seat to hold each end bearing in place, and a pin disposed through the lower portion of each bracket for keeping the spring seat and clamping member in adjusted position.

5. The combination with a vehicle having a frame provided with side members, and a pair of wheels disposed at opposite sides of the frame, of a pair of brackets secured to said side members and being arranged in transverse alinement relative to the frame, each bracket having a side portion overlapping the outer side of the side member and a bottom portion depending below the lower side of the side member, bolts connecting each bracket to the side member, a transverse housing disposed under the frame between the lower portions of said brackets and containing a central bearing, end bearings in the lower portions of said brackets and in axial alinement with said central bearing, opposed spring actuating members independently rotatable in said central bearing, a stationary inwardly facing spring seat threaded into the lower portion of each bracket for rotary adjustment, a coiled torsion spring disposed between each seat and spring actuating member, a shaft journaled through each end bearing and having its inner end splined to a spring actuating member, a crank arm at the outer end of each shaft and extending in a plane substantially parallel with that of the frame, a support member pivoted to the outer end of each arm, a bearing member connecting each wheel to a support member, means including a clamping member threaded in the lower portion of each bracket for coaction with the spring seat to hold each end bearing in place, and a pin disposed through the lower portion of each bracket for keeping the spring seat and clamping member in adjusted position.

6. The combination with a vehicle having a frame provided with side members and a pair of wheels disposed at opposite sides of the frame, of a pair of brackets secured to said side members and being arranged in transverse alinement relative to the frame, each bracket having a bottom portion depending below the side member, a transverse housing disposed under the frame between the lower portions of said brackets and containing a central bearing, end bearings in the lower portions of said brackets and in axial alinement with said central bearing, opposed spring actuating members independently rotatable in said central bearing, a stationary inwardly facing spring seat mounted in the lower portion of each bracket for rotary adjustment, a coiled torsion spring disposed between each seat and spring actuating member, a shaft journaled through each end bearing and having its inner end connected to a spring actuating member, a crank arm at the outer end of each shaft and extending rearwardly in a plane substantially parallel with that of the frame, a support member pivoted to the outer end of each arm and having an upwardly projecting arm, a link pivoted to the side portion of each bracket above the shaft and to the upwardly projecting arm of each support member, a tie bar connecting each crank arm and link, means including a clamping member mounted in the lower portion of each bracket for coaction with the spring seat to hold each end bearing in place, and means disposed through the lower portion of each bracket for keeping the spring seat and clamping member in adjusted position.

7. The combination with a vehicle having a frame provided with side members and a pair of wheels disposed at opposite sides of the frame, of a pair of brackets secured to said side members and being arranged in transverse alinement relative to the frame, each bracket having a bottom portion depending below the side member, a transverse housing disposed under the frame between the lower portions of said brackets and containing a central bearing, end bearings in the lower portions of said brackets and in axial alinement with said central bearing, opposed spring actuating members independently rotatable in said central bearing, a stationary inwardly facing spring seat mounted in the lower portion of each bracket, a coiled spring disposed between each seat and spring actuating member, a shaft journaled through each end bearing and having its inner end connected to a spring actuating member, a crank arm at the outer end of each shaft and extending in a plane substantially parallel with that of the frame, a support member pivoted to the outer end of each arm and h ving an upwardly projecting arm, a link pivoted to the side portion of each bracket above the shaft and to the upwardly projecting arm of each support member, and means connecting each wheel to a support member.

8. The combination with a vehicle having a frame, and front and rear wheels arranged in pairs at opposite sides thereof, of a pair of brackets secured to opposite sides of the frame in front of the centers of the front wheels, rearwardly extending crank means connecting said front wheels to said brackets and acting to control vertical movement of the wheels relative to said frame, a transverse cylindrical housing disposed under said frame between said brackets and containing axially disposed individual spring means associated with each of said crank means for resiliently resisting vertical movement between said front wheels and the frame, the front wheels having bearing members adapted to be turned relative to said crank means for steering the vehicle, bell crank levers pivoted to said brackets above said frame, a transverse tie rod disposed above said frame and connecting said bell crank levers, steering arms mounted on said bearing members, links connecting said arms and bell crank levers through universal joints, a vehicle steering gear having an arm arranged adjacent one side of said frame, and a drag link connecting said last named arm to one of said bell crank levers.

9. The combination with a vehicle having a frame, and front and rear wheels arranged in pairs at opposite sides thereof, of a pair of brackets secured to opposite sides of the frame in front of the centers of the front wheels, rearwardly extending crank means connecting said front wheels to said brackets and acting to control vertical movement of the wheels relative to said frame, spring means associated with each of said crank means for resiliently resisting vertical movement between said front wheels and the frame, the front wheels having bearing members adapted to be turned relative to said crank means for steering the vehicle, bell crank levers pivoted to said brackets above said frame, a transverse tie rod disposed above said frame and connecting said bell crank levers, steering arms mounted on said bearing members, links connecting said arms and bell crank levers through universal joints, a vehicle steering gear having an arm arranged adjacent one side of said frame, and a drag link connecting said last named arm to one of said bell crank levers.

10. The combination with a vehicle having a frame, and wheels arranged at opposite sides thereof, of a pair of brackets secured to opposite sides of the frame, crank means connecting said front wheels to said brackets and acting to control vertical movement of the wheels relative to said frame, means for resiliently resisting vertical movement between said front wheels and the frame, the wheels having bearing members adapted to be turned relative to said crank means for steering the vehicle, bell crank levers pivoted to said brackets above said frame, a transverse tie rod disposed above said frame and connecting said bell crank levers, steering arms mounted on said bearing members, links connecting said arms and bell crank levers through universal joints, a vehicle steering gear having an arm arranged adjacent one side of said frame, and a drag link connecting said last named arm to one of said bell crank levers.

11. In a spring suspension unit for vehicles, the combination of a pair of brackets adapted to be secured to opposite sides of the frame of the vehicle, a transverse cylindrical housing mounted between said brackets, central and end bearings in said housing, spaced spring actuating members rotatable in the central bearing and having outwardly facing spring seats at their outer ends, inwardly facing stationary spring seats adjustably mounted on said brackets within the housing, coiled torsion springs disposed between said spring seats and having their ends secured to the seats, spaced shafts connected at their inner ends to said spring actuating members and journaled in said end bearings, rearwardly and outwardly extending crank arms fixed to the outer ends of said shafts, support members pivoted to the outer ends of said crank arms and having upwardly projecting arms, front wheel bearing members connected to said support members by knuckle joints for steering purposes, links arranged parallel to said crank arms and connecting said upwardly projecting arms to said brackets, and tie bars connecting said links and crank arms.

12. In a spring suspension unit for vehicles, the combination of a pair of brackets adapted to be secured to opposite sides of the frame of the vehicle, a transverse housing mounted between said brackets, central and end bearings in said housing, spaced spring actuating members rotatable in the central bearing, coiled torsion springs having their ends secured to the brackets and spring actuating members, spaced shafts connected at their inner ends to said spring actuating members and journaled in said end bearings, rearwardly extending crank arms fixed to the outer ends of said shafts, support members pivoted to the outer ends of said crank arms and having upwardly projecting arms, wheel bearing members connected to said support members, links arranged parallel to said crank arms and connecting said upwardly projecting arms to said brackets, and tie bars connecting said links and crank arms.

13. In a spring suspension unit for vehicles, the combination of a pair of brackets adapted to be secured to opposite sides of the frame of the vehicle, a pair of spaced coiled torsion springs disposed between said brackets and having their outer ends secured thereto, a pair of spaced shafts connected at their inner ends to the inner ends of said springs and journaled in said brackets, crank arms at the outer ends of said shafts, support members pivoted to the outer ends of said crank arms and having upwardly projecting arms, front wheel bearing members connected to said support members by knuckle joints for steering purposes, links arranged parallel to said crank arms and connecting said upwardly projecting arms to said brackets, and tie bars connecting said links and crank arms.

14. The combination with a vehicle having a frame, and front and rear wheels arranged in pairs at opposite sides thereof; of a pair of brackets secured to opposite sides of the frame in front of the centers of the front wheels, rearwardly extending crank means connecting said front wheels to said brackets and acting to control vertical movement of the wheels relative to said frame, spring means associated with each of said crank means for resiliently resisting vertical movement between said front wheels and the frame, the front wheels having bearing members adapted to be turned relative to said crank means for steering the vehicle, bell crank levers pivoted to said brackets above said frame, a transverse tie rod disposed above said frame and connecting said bell crank levers, steering arms mounted on said bearing members, links connecting said arms and bell crank levers through universal joints, a vehicle steering gear having an arm arranged adjacent one side of said frame, and a drag link connecting said last named arm to one of said bell crank levers, the steering linkage being so disposed as to be concealed and protected by the front shield of the vehicle.

15. In a spring suspension for vehicles, the combination of a vehicle frame, a bracket fixed to said frame and having a stud, a crank arm pivoted to said bracket below said stud, resilient means resisting rotation of said crank arm relative to said bracket, a support member having a stud pivoted to the outer end of said crank arm, a wheel spindle member having an upwardly projecting and inwardly extending steering arm, a wheel associated with said wheel spindle member, a pivot pin connecting said wheel spindle member to said support member to provide a knuckle joint for steering purposes, the support member having an upwardly projecting arm provided with a stud, a link disposed parallel to said crank arm and pivoted at its ends to said bracket and upwardly projecting arm studs, the link serving to prevent rotation of said support member with the wheel spindle member and acting to aid the crank arm in resisting side thrusts, a tie bar coacting with said upwardly projecting arm to hold the support member and upwardly projecting arm studs in fixed spaced relation, a bell crank lever pivoted to said bracket, a link disposed parallel to said first named link and connecting said bell crank lever to said steering arm, universal joints connecting the ends of said last named link to said bell crank lever and steering arm, the joints being disposed above and in line with the centers of the axis of rotation of the crank arm and the bracket stud, and the support member and arm studs, respectively, and means for actuating said bell crank lever to steer said wheel, the arrangement being such that the steering of said wheel is not affected by the rising and falling of the wheel relative to said frame.

16. In a spring suspension for vehicles, the combination of a vehicle frame, a bracket fixed to said frame and having a stud, a crank arm pivoted to said bracket below said stud, resilient means resisting rotation of said crank arm relative to said bracket, a support member having a stud pivoted to the outer end of said crank arm, a wheel spindle member having an upwardly projecting and inwardly extending steering arm, a wheel associated with said wheel spindle member, a pivot pin connecting said wheel spindle member to said support member to provide a knuckle joint for steering purposes, the support member having an upwardly projecting arm provided with a stud, a link disposed parallel to said crank arm and pivoted at its ends to said bracket and upwardly projecting arm studs, the link serving to prevent rotation of said support member with the wheel spindle member and acting to aid the crank arm in resisting side thrusts, a bell crank lever pivoted to said bracket, a link disposed parallel to said first named link and connecting said bell crank lever to said steering arm, universal joints connecting the ends of said last named link to said bell crank lever and steering arm, the joints being disposed above and in line with the centers of the axis of rotation of the crank arm and the bracket stud, and the support member and arm studs, respectively, and means for actuating said bell crank lever to steer said wheel, the arrangement being such that the steering of said wheel is not affected by the rising and falling of the wheel relative to said frame.

17. In a spring suspension for vehicles, the combination of a frame bracket having upper and lower pivots, a support member having upper and lower pivots forming a parallelogram with said upper and lower bracket pivots, a crank arm connecting said lower pivots, a link connecting said upper pivots, a wheel connected to said support member through a pivot pin disposed parallel to the upright sides of the parallelogram, a steering arm associated with said wheel, a steering lever pivoted to said bracket, and a link disposed parallel to said first named link and connecting said lever to said steering arm through universal joints, with the wheel in normal position one of said universal joints being in line with the centers of said upper and lower bracket pivots and the other one being in line with the centers of said upper and lower support member pivots, the arrangement being such that the steering of said wheel is not affected by the rising and falling thereof due to the travel of the vehicle, the bracket pivots remaining fixed relative to the rest of the parallelogram which flexes to permit up and down movement of the support member pivots.

18. In a spring suspension for vehicles, the combination of a frame bracket having upper and lower pivots, a support member having upper and lower pivots forming a parallelogram with said upper and lower bracket pivots, a crank arm connecting said lower pivots, a link connecting said upper pivots, a wheel connected to said support member, a steering arm associated with said wheel, a steering lever pivoted to said bracket, and a link disposed parallel to said first named link and connecting said lever to said steering arm through joints, with the wheel in normal position one of said joints being in line with the centers of said upper and lower bracket pivots and the other one being in line with the centers of said upper and lower support member pivots, the arrangement being such that the steering of said wheel is not affected by the rising and falling thereof due to the travel of the vehicle, the bracket pivots remaining fixed relative to the rest of the parallelogram which flexes to permit up and down movement of the support member pivots.

RALPH J. STIMSON.